United States Patent
Spengler (10) Patent No.: US 6,287,678 B1
(45) Date of Patent: Sep. 11, 2001

(54) COMPOSITE STRUCTURAL PANEL WITH THERMOPLASTIC FOAM CORE AND NATURAL FIBERS, AND METHOD AND APPARATUS FOR PRODUCING THE SAME

(75) Inventor: Ernst Spengler, Heusenstamm by Ffm. (DE)

(73) Assignee: R + S Technik GmbH, Offenbach am Main (DE)

( * ) Notice: Subject to any disclaimer, the term of this patent is extended or adjusted under 35 U.S.C. 154(b) by 0 days.

(21) Appl. No.: 09/173,878

(22) Filed: Oct. 16, 1998

(51) Int. Cl.$^7$ ............................................. B32B 31/00
(52) U.S. Cl. ........................... 428/297.4; 428/300.7; 428/317.1; 428/318.6; 428/319.3; 156/228; 156/324
(58) Field of Search .......................... 428/317.1, 318.6, 428/319.3, 297.4, 300.7; 156/228, 324

(56) References Cited

U.S. PATENT DOCUMENTS

| | | |
|---|---|---|
| 4,508,499 | 4/1985 | Spengler . |
| 4,519,766 | 5/1985 | Spengler . |
| 4,634,483 | 1/1987 | Spengler . |
| 4,717,143 | 1/1988 | Spengler . |
| 5,413,661 | 5/1995 | Spengler et al. . |
| 5,614,285 | 3/1997 | Gardill . |
| 5,709,925 | 1/1998 | Spengler et al. . |
| 5,718,791 | 2/1998 | Spengler . |
| 5,942,321 * | 8/1999 | Romesberg et al. ............ 428/300.7 |

FOREIGN PATENT DOCUMENTS

| | | |
|---|---|---|
| 0082131 | 6/1983 | (EP) . |
| 0671259 | 9/1995 | (EP) . |
| 0771644 | 5/1997 | (EP) . |
| 0774343 | 5/1997 | (EP) . |

* cited by examiner

Primary Examiner—Elizabeth M. Cole
(74) Attorney, Agent, or Firm—W. F. Fasse; W. G. Fasse (57) ABSTRACT

A composite structural panel includes a cover sheet laminated onto a three-layered substrate including a thermoplastic foam core sandwiched between two composite outer layers. Each composite outer layer includes natural fibers embedded in a thermoplastic matrix. The thermoplastic material of all layers is preferably polypropylene, and the core consists of an expanded cellular polypropylene rigid foam. In a method for forming the composite structural panel, a first preheated outer layer is laminated and molded onto the foam core in a first molding step, and then the second preheated outer layer and the cover sheet are laminated and molded onto the foam core in a second molding step, with a cooling-down time allowed between the two molding steps. In this manner, each preheated outer layer provides enough heat to thermally fuse the outer layer onto the foam core, without overheating the foam core to the point of softening or melting the foam core. The low density foam core provides a spacing distance between the strong composite outer layers, and therefore the finished composite structural panel has a high strength and rigidity, and a high strength-to-weight ratio. The structural panel can be molded into any desired three-dimensional contoured configuration during the molding process.

24 Claims, 5 Drawing Sheets

COMPOSITE STRUCTURAL PANEL WITH THERMOPLASTIC FOAM CORE AND NATURAL FIBERS, AND METHOD AND APPARATUS FOR PRODUCING THE SAME

FIELD OF THE INVENTION

The invention relates to a composite structural panel including a core of thermoplastic material and outer layers containing natural fibers in a thermoplastic material. The invention further relates to a method and an apparatus for producing such a composite structural panel.

BACKGROUND INFORMATION

It is generally known to use composite structural panels comprising polymer materials as interior trim components in motor vehicles, aircraft, railroad cars, and the like. Such trim components include molded dashboards, interior door panels and inserts, headliners, and the like. Conventional present-day composite panels for use as such trim components are made of a polyurethane foam material reinforced with glass fibers saturated or embedded in epoxy resin. More specifically, one or more layers of glass rovings impregnated with epoxy resin are laminated onto the foam for reinforcing and stiffening the resulting composite panel. As a further alternative, a polypropylene powder material may be incorporated in the glass roving layers as a binder.

Such a conventional composite panel and the method of its manufacture suffer distinct disadvantages, For example, handling of the glass fiber material and handling and application of the epoxy resin in fluid form are difficult and complicated, especially in view of worker safety and environmental concerns. Moreover, this process, for example carried out as a lay-up process, requires substantial handling effort, and also a long curing time for the hardening the resin in a heated compression mold. Since the finished trim components contain a mixture of different non-degradable and incompatible materials, e.g. polyurethane foam, glass fibers and epoxy resin, these trim components are not recyclable by means of separation and reprocessing of the materials. Since at least some of the materials are non-combustible or give off noxious or toxic gases when combusted, the trim components are also not thermo-recyclable, i.e. burnable as a fuel. The recyclability of composite structural panels in general, and especially motor vehicle trim components, is presently a strong driving force in the industry. There is a great need to provide composite materials that can be easily separated, reprocessed for reuse, or combusted as an industrial fuel.

Another type of known composite structural panel, as disclosed in U.S. Pat. No. 5,709,925 (Spengler et al.) is based on a combination of natural fibers and a fibrous thermoplastic material. More particularly, such a composite structural panel includes a laminated composite substrate that comprises a core layer and two cover layers laminated onto the core layer, wherein the core layer comprises natural fibers and a fibrous thermoplastic material, and each cover layer respectively comprises synthetic fibers and a fibrous thermoplastic material. Such a structural panel achieves environmental advantages, because all of the materials of the multi-layer panel are easily broken down or otherwise processed for reuse or recycling. Namely, all of the materials can be burned without producing toxic gases, or the thermoplastic material can be melted down while burning off the natural fibers and/or separating out the fiber materials. These known structural panels also achieve very good impact energy absorption without splintering or shattering, and thus are effective for providing occupant crash protection in motor vehicles and the like.

While these multi-layered composite panels are very suitable and effective for achieving their intended purposes, it is desirable to provide a composite panel having all the environmental advantages, even better impact energy absorption characteristics, and an even simpler structure especially including a foam core, that may be produced by a relatively simple process.

SUMMARY OF THE INVENTION

In view of the above, it is an object of the invention to provide a composite structural panel having a foam core and incorporating natural fibers, that can be easily reprocessed or recycled in an environmentally friendly manner, that can be compression molded into different surface contours and configurations, that has the necessary strength and stiffness for forming large surface trim components such as automobile headliners, and that provides impact energy absorption without splintering, shattering, or breaking. It is a further object of the invention to expressly avoid the use of glass fibers, polyurethane, epoxy resin and other thermosetting or otherwise environmentally non-degradable materials. It is still another object of the invention to provide a simplified process and apparatus for producing such composite structural panels. The invention further aims to avoid or overcome the various disadvantages of the prior art, and to achieve additional advantages, as apparent from the present description.

The above objects have been achieved in a composite structural panel according to the invention, comprising a thermoplastic foam core sandwiched between two outer layers that each respectively comprise natural fibers intermixed with thermoplastic material. Preferably, the thermoplastic material of the outer layers comprises thermoplastic fibers that have been at least partially, or predominantly or entirely melted to form a matrix in which the natural fibers are embedded. The polypropylene fibers and the natural fibers of each outer layer are preferably interneedled together, such that the respective outer layer comprises an intertwined mixture of polypropylene fibers and natural fibers. Alternatively, the polypropylene fibers and the natural fibers can each be provided in respective layers of non-oriented, non-woven fibers, with several thin alternating layers of polypropylene fibers and natural fibers stacked or laid on top of each other to form each respective outer layer. Once the outer layer is heated to about 200° C., the polypropylene fibers are at least partially melted, to become fusion bonded to each other and around the natural fibers, such that each outer layer in the finished composite panel has a structure including polypropylene fibers and natural fibers embedded in a polypropylene matrix or skeleton structure.

The thermoplastic foam core and the thermoplastic fibers of the outer layers preferably both consist of a polyolefin, and particularly polypropylene. The foam core is preferably a substantially rigid sheet or board of expanded polypropylene beads that have been heated and pressed together. Such an expanded cellular polypropylene foam material has a structure, appearance and physical properties generally similar to expanded cellular polystyrene such as "styrofoam" (TM), but is much more environmentally friendly than the polystyrene material of the "styrofoam".

The natural fibers are generally cellulose fibers from various natural sources. Particularly, the natural fibers may include one or more natural plant fibers such as straw, cotton, flax, hemp, jute, sisal, and kenaf, or natural fibers such as wood product fibers. The preferred natural fiber is a kenaf bast fiber. The ratio of natural fibers to polypropylene fibers in the outer layers is preferably in the range from 30% polypropylene with 70% natural fibers to 70% polypropylene with 30% natural fibers.

The composite structural panel may further comprise any desired cover material such as a decorative fabric or film laminated onto the three-layered substrate. The outer decorative cover sheet may be a synthetic film or a textile, that is coated at least on the interface side with a coating film of polypropylene or polyethylene to achieve fusion bonding onto the respective outer layer, without requiring any adhesive applied therebetween.

The structural panel preferably consists entirely of polypropylene and one or more natural fiber materials, along with the optional cover sheet. For this reason, the structural panel can be easily recycled or thermo-processed for an environmentally friendly reuse or recovery, because the cover sheet can be relatively easily stripped off (or processed along with the composite substrate if the cover sheet consists of thermoplastic material), while the thermoplastic of the substrate can be melted down while burning off the natural fibers. Alternatively, the entire panel can be burned as a fuel, because the polypropylene and the natural cellulose fibers can be burned without giving off any toxic gases.

The above objects have further been achieved by a method and apparatus according to the invention, for producing the present composite structural panel. The present process carried out by the present apparatus is fast, clean, and environmentally friendly. The individual outside layers and the center foam core are separately externally heated and then transported into a chilled forming mold. Through a hot molding or forming process, a fast production cycle can be achieved, and the structural panel can be molded into any desired surface contour and configuration, while also compressing the foam core to the required density and thickness for any particular application. The overall strength and stiffness of the resulting composite panel can be easily adjusted as required, by providing a suitable thickness of the foam core. Namely, the resulting spacing distance between the outer layers directly and strongly influences, and substantially defines, the overall stiffness and strength of the panel.

According to a first embodiment of the method, the outer layers are heated to a temperature in the range of 170° C. to 200° C. while the foam core is heated to a temperature in the range of 40° C. to 100° C. Then the three layers, i.e. the foam core and the two outer layers, are transported into positions between upper and lower chilled forming molds. A cover sheet material can be placed in one of the mold sections. The mold is then closed, whereby all four layers are pressed and bonded together, compressed, and molded or formed into the desired three-dimensional surface contour. The heat energy of the pre-heated outer layers and the pre-heated foam core softens the foam core material so that it becomes flexible and moldable, and also provides sufficient heat at the bonding interface surfaces so that the outer layers are slightly melted and fusion bonded to the core material during the molding process.

In this manner, no additional inter-layer adhesive is necessary, which simplifies the production process and also simplifies the structure and composition of the finished composite structural panel. Also, due to the heat during the molding process, the outer layers are softened sufficiently so that the material can flow individually, depending on the local three-dimensional contour and configuration, before the composite is stabilized by cooling in the chilled mold. As a result, the outer layers of the finished composite have been stress-relieved so that there is no residual tension in the outer layers. Moreover, the flow-intermingling of the outer layer materials with the foam core provides an especially strong bond at the interface.

The above-mentioned one-step molding method is very fast and efficient, but requires rather precise control of the pre-heating temperatures, molding times, cooling temperatures and the like. Namely if the combined heating effect of the pre-heated outer layers and the preheated core is too great, the thermoplastic material of the foam core will be softened too much and the core will completely collapse or be insufficiently rigid to allow the composite panel to be molded into a three-dimensionally contoured configuration.

To avoid the difficulties of the one-step method, while achieving all of the advantages and additional advantages, the invention also provides a step-by-step layered sandwich molding process, which is referred to as a two-step process herein. In this two-step process, a first outer layer of natural fibers interneedled or otherwise intermixed with polypropylene fibers is heated and pre-compressed in a hot press to a density of about 0.5 to 0.8 kg/dm$^2$ and a temperature of about 200° C. The foam core material is slightly pre-heated or pre-tempered to a temperature in a range of 40 to 100° C., and then the pre-heated first outer layer is pressed and molded onto the foam core in a chilled mold. Once this first molding and laminating step has been completed, and the resulting pre-laminate has been sufficiently stabilized by cooling, then the second outer layer, which has been pre-compressed and preheated to 200° C., as well as the outer decorative cover sheet are pressed and molded onto the pre-laminate in a second step. During this second step, the heat of the second outer layer is sufficient to fusion bond the second outer layer respectively onto the core and the cover sheet, without overheating the foam core to the point of excessive softening or melting, e.g. without melting more than 10% of the core material along the interface surfaces thereof. After a short cooling time in the mold, the panel or formed component can be removed. In this two-step process, it is possible to achieve the necessary temperature for fusion bonding each outer layer onto the foam core, without introducing too much heat energy into the foam core such that the foam core becomes too soft and collapses during the molding process.

To carry out the above described two-step process with a compact and efficient arrangement of molding equipment, the invention provides an apparatus in which the four layers of material (i.e. the first outer layer, the foam core, the second outer layer, and the cover sheet) are preheated to different temperatures and introduced into the mold from four different directions, i.e. from four sides of the mold. According to the invention, a forming mold is at a center location, two heating presses are located respectively to the right and to the left of the forming mold, a foam feeding and preheating station is located behind the forming mold, and a cover sheet transport frame transports the cover sheet into the mold from the fourth or front side. By providing separate heating presses on the right and the left, the two-step molding process can be carried out quickly and efficiently, without necessitating any dead time or waiting time while loading and then preheating the outer layers in the heating presses. Either one or both of the mold sections of the forming mold can be embodied as a vacuum mold for vacuum forming the decorative cover sheet and for achieving improved surface contouring, or can be simple pressure molds.

The invention achieves at least the following special advantages. The finished composite structural panel according to the invention has a very high strength and stiffness to weight ratio. For example, a finished automotive headliner including the inventive three-layered substrate and a decorative cover sheet has a weight or area density in the range of 800 to 900 g/m$^2$, while achieving a self-supporting strength and stiffness. This high strength and low weight is achieved largely due to the core of thermoplastic foam, and particularly expanded cellular polypropylene foam. The foam core itself has a certain stiffness, and a very low density, but especially the foam core acts as a spacer element between the strong outer layers. As is well known according to statics, by spacing apart the outer layers, which have a good tensile strength, the finished sandwich composite panel achieves a remarkable strength and stiffness, which increases directly with the increase in the spacing distance between the outer layers, i.e. the thickness of the foam core. Thus, different panel strengths can be achieved simply by providing a different thickness of the foam core, while using the same outer layer material. An outer layer material of mixed fiber fleece having an area density of 300 g/m$^2$ is therefore suitable for a wide range of applications, but outer layers with a density of 800 g/m$^2$ can be used for applications requiring extremely high strength.

The composite structure of the panels, including an air permeable expanded cellular polypropylene core and composite outer layers including natural fibers and possibly polypropylene fibers embedded in a polypropylene matrix, also achieves very good sound absorbing and sound damping qualities, because the air permeability of the core and of the outer layers is adjustable or selectable as desired. Moreover, the resulting composite structure has a very high energy absorption, and is therefore a significant safety feature for providing impact protection for the occupants of a motor vehicle or the like. In impact testing, the present composite structural panels have been found to absorb and dissipate the energy of an impact by compressing and deforming the panel, but without splintering, shattering or otherwise breaking through the panel. This provides a significant safety advantage over structural panels including fiberglass, honeycomb cores, or the like.

Another significant advantage of the present composite structural panel is that it is three-dimensionally formable to a large degree. Namely, the panel can be molded into three-dimensional surface contours as desired for automotive interior trim components and the like. The forming configuration can include an overall forming of both sides of the panel, or a deformation (e.g. indentation) of only one side of the panel, whereby the foam core is compressed to a greater extent at the affected location. Therefore, the present composite structural panel has a great advantage over prior composite panels including a honeycomb core such as an aluminum honeycomb core or a polymeric honeycomb core. Such conventional structural panels including honeycomb cores cannot be molded into a three-dimensional configuration, without disrupting the honeycomb core. Instead, the surface contours must be built-up or molded separately from the honeycomb core. The present composite structural panels are therefore advantageous in applications in the aircraft construction industry, for example, which have traditionally used honeycomb core composite panels, but can now use the present formable composite panels. Moreover, the present panels have a similar or even better strength-to-weight ratio as compared to the conventional honeycomb core panels.

The special features and advantages of the inventive method and apparatus allow the present composite panel to be manufactured. The preferred two-step process allows the composite sandwich to be built-up in a step-by-step or layer-by-layer manner with thermal fusion bonding between each two adjacent layers. According to the two-step process, the two pre-heated and pre-compressed outer layers are individually molded and laminated onto the foam core in two separate steps. By not simultaneously laminating and molding both outer layers onto the foam core, overheating and melting of the foam core is avoided, while sufficient heat is still provided to achieve the desired thermal fusion bonding of each layer onto the next layer. The key advantage of the invention in this regard is to achieve a sufficient temperature (e.g. 140 to 170° C.) at the interface between the foam core and each respective outer layer to enable the thermal fusion bonding, without heating the entirety of the foam core to its softening and melting temperatures in the range of 120 to 170° C. Since the foam core is typically only 5 to 7 mm thick, the foam core would generally overheat and soften or melt if two preheated outer layers are simultaneously laminated onto the foam core. This problem is avoided by the present two-step process. Such a step-by-step thermal sandwich laminating process has not previously been known.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
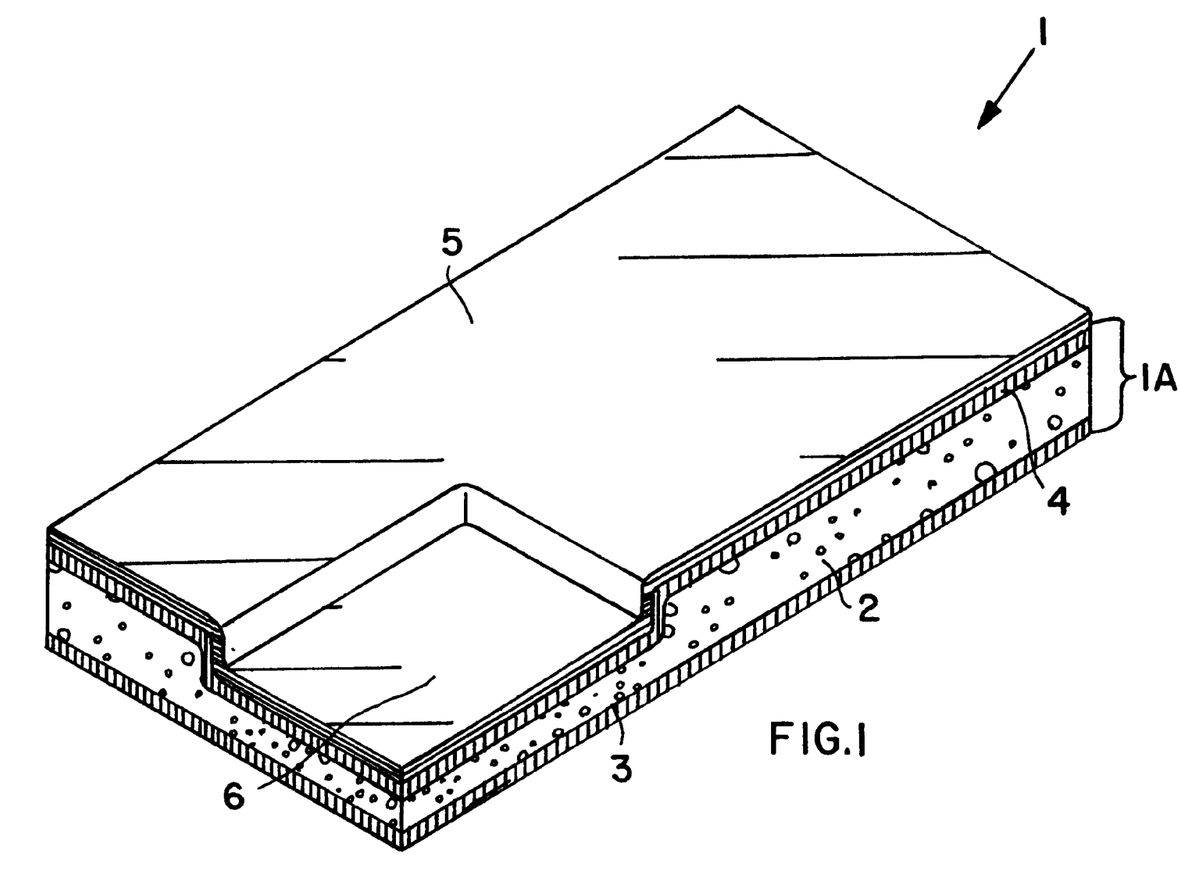
FIG. 1 is a schematic perspective cut-away view of a molded composite structural panel according to the invention.

As shown in FIG. 1, a molded composite structural panel 1 according to the invention includes a three-layered substrate 1A, with a cover sheet 5 laminated thereon. The three-layered substrate 1A includes a thermoplastic foam core 2, which preferably comprises a polyolefin foam, more preferably comprises polyethylene and/or polypropylene foam, and most preferably consists of a substantially rigid expanded cellular polypropylene foam. The foam core 2 is sandwiched and laminated between a first outer layer 3 and a second outer layer 4, which each respectively comprise natural fibers and a thermoplastic matrix material. The natural fibers are most preferably kenaf fibers, and the thermoplastic matrix material is preferably a polyolefin, more preferably polypropylene and/or polyethylene, and most preferably consists of polypropylene fibers that have been partially melted to result in a structure of remaining polypropylene fibers and natural fibers embedded in a melted polypropylene matrix. The two outer layers 3 and 4 are thermal fusion bonded onto the foam core 4.

The composition of the outer layers 3 and 4 includes from 30 to 70% of polypropylene fibers correspondingly mixed with from 70 to 30% of natural fibers. The particular composition is chosen within this range to achieve the desired stiffness characteristic and the like. The natural fibers and polypropylene fibers of each outer layer 3 and 4 have been interneedled together or layered and laminated together, or otherwise intermixed to form a composite outer layer.

The cover sheet 5 is a decorative textile fabric or a film such as a synthetic leatherette or the like. If the cover sheet 5 does not comprise a thermoplastic or particularly polyolefin base material, the back surface of the cover sheet 5 is coated with a polypropylene or polyethylene film, to enable fusion bonding of the cover sheet 5 onto the substrate 1A. The back side of the cover sheet 5 can also be provided with a "soft-touch" polypropylene foam layer. All of the layers, namely the cover sheet 5, the outer layers 3 and 4, and the foam core 2 are thermal fusion bonded to each other. Namely, the polypropylene material of each layer is melted and bonded to the polypropylene material of the adjacent layers.

The present structural panel 1 may be manufactured as a flat planar panel, for later cutting, forming or the like, as needed in any particular application. Alternatively, and preferably, the present composite structural panel 1 may be originally manufactured having a desired three-dimensionally molded contour. As an example, FIG. 1 schematically shows a depression or compressed area 6 in the outer or exposed surface of the composite panel 1. Thereby, the foam core 2 is compressed and hardened to a greater extent in this compressed area 6. Moreover, all of the edges of a panel 1 may be compressed to be sealed or crimped closed for providing a finished edge.

Figure 2:
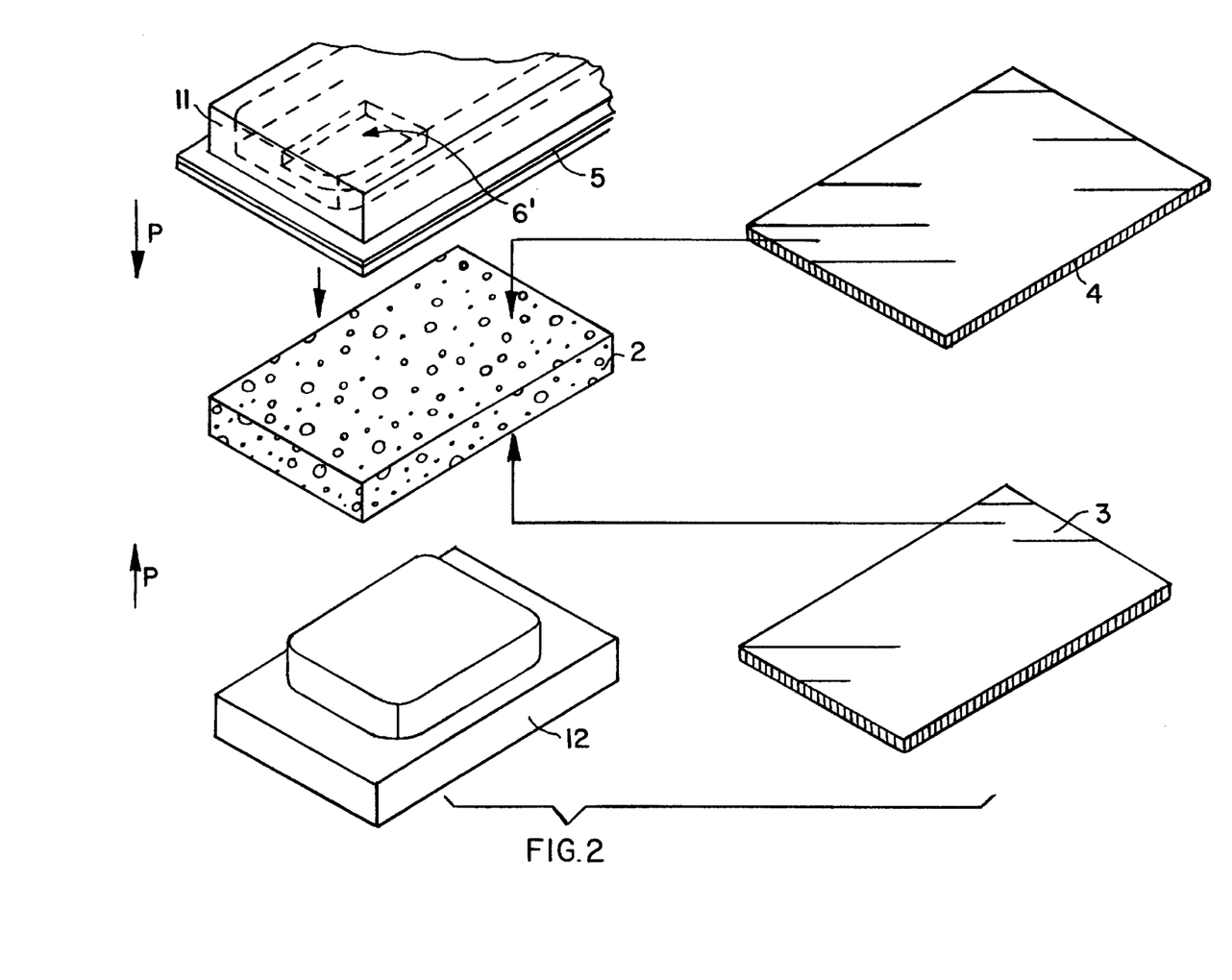
FIG. 2 is a schematic exploded view of the foam core to be sandwiched between two outer layers and then press-molded and laminated with a cover sheet, between upper and lower mold sections.

FIG. 2 schematically represents a process and mold for producing the composite structural panel 1. The molding equipment includes a lower mold section 12 and a mating upper mold section 11, with a mold protrusion 6' adapted to form the compressed area 6 in the finished composite structural panel 1. As represented in FIG. the first and second outer layers 3 and 4 are arranged on opposite sides of the polypropylene foam core 2, the cover sheet 5 is arranged on top of the second outer layer 2, and then this sandwich is compressed and molded between the upper and lower mold sections 11 and 12.

According to the preferred method of the invention, the molding is carried out in a two-step process, whereby the mold sections 11 and 12 open and close through two cycles to complete the molding of the composite structural panel. The two outer layers 3 and 4 are each independently preheated and pre-compressed in a heating press, preferably to a temperature of about 200° C. and a density of about 0.5 to 0.8 kg/dm². Simultaneously, the foam core 2 is slightly preheated or pretempered to a temperature in the range of 40 to 100° C. to ensure that the desired thermal fusion bonding will take place. Then, in the first molding step, the preheated first outer layer 3 is laid onto the lower mold section 12, the pre-tempered foam core 2 is arranged between the upper and lower mold sections 11 and 12, and these mold sections 11 and 12 are closed and a molding pressure is applied in the direction of arrows P. Thereby the preheated first outer layer 3 is thermal fusion bonded onto the foam core 2, and the foam core 2 is initially molded into the desired three-dimensionally formed contour.

Then, after a short cooling time, the mold is opened, to carry out the subsequent second molding step by laying the preheated second outer layer 4 onto the pre-laminate of the foam core 2 and the first outer layer 3, arranging the cover sheet 5 between the second outer layer 4 and the upper mold section 11, and then again closing the mold. In this second molding step the second outer layer 4 is laminated onto the foam core 3, the cover sheet 5 is laminated onto the second outer layer 4, and the overall composite structural panel is molded into its final three-dimensionally contoured configuration.

The mold sections 11 and 12 are preferably cooled, for example, by a cooling fluid flowing through channels provided therein, and a sufficient cooling time is allowed between the first and second molding steps, to ensure t hat the foam core 2 does not become overheated to a temperature at which it softens or melts in its interior. Namely, the melting and fusion bonding is only to occur immediately at the outer surfaces of the foam core 2 that are to be bonded onto the outer layers 3 and 4. The heat provided by the preheated outer layers is sufficient for this purpose. After completion of the second molding step, a short cooling time of approximately 40 to 60 seconds is allowed to elapse, and then the finished composite structural panel can be removed from the mold.

Figure 3:
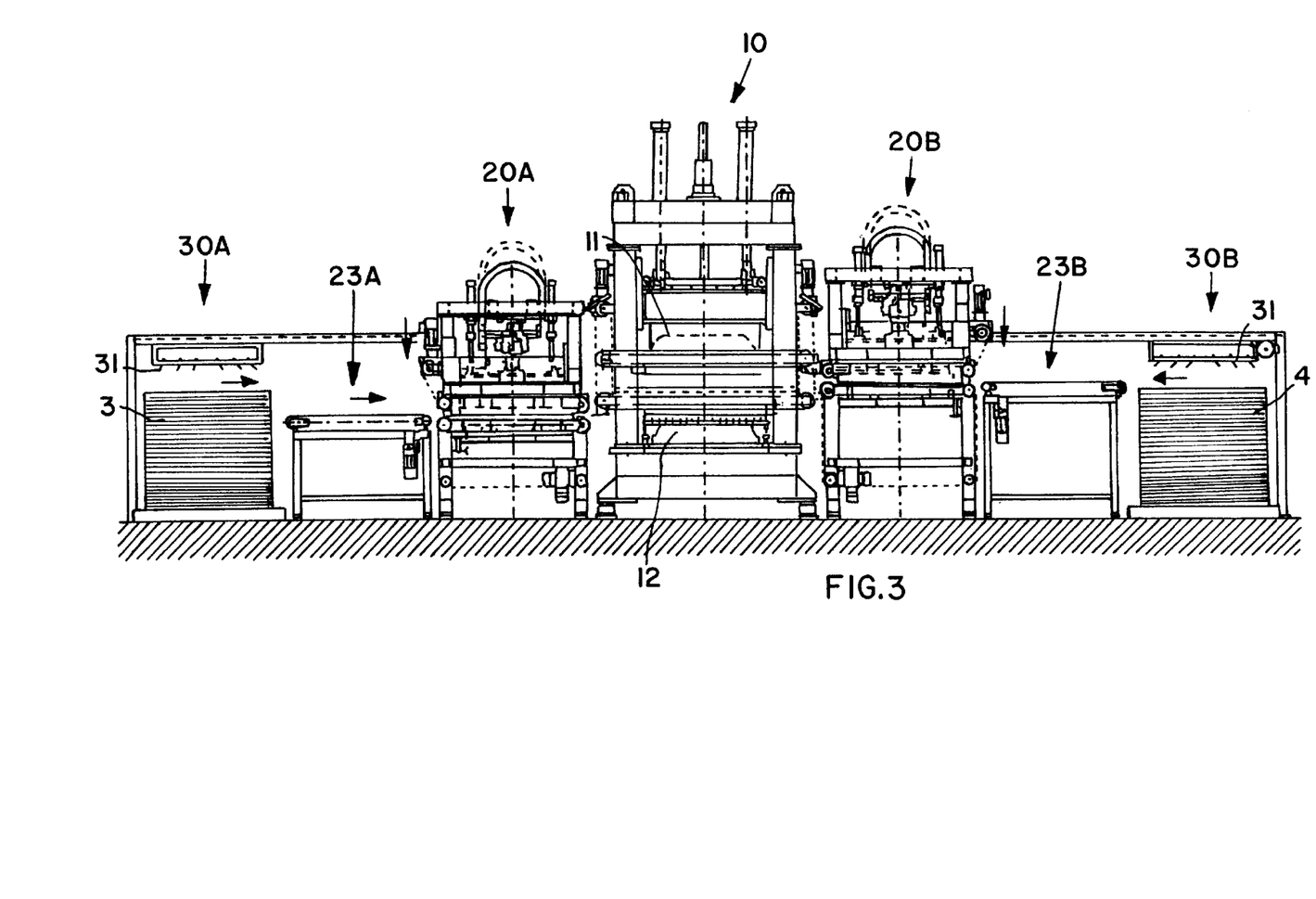
FIG. 3 is a side elevation view of an apparatus according to the invention for producing a molded composite panel, including a forming mold, two heating presses, a foam feeding and preheating station, and a cover sheet feeding station.
Figure 4:
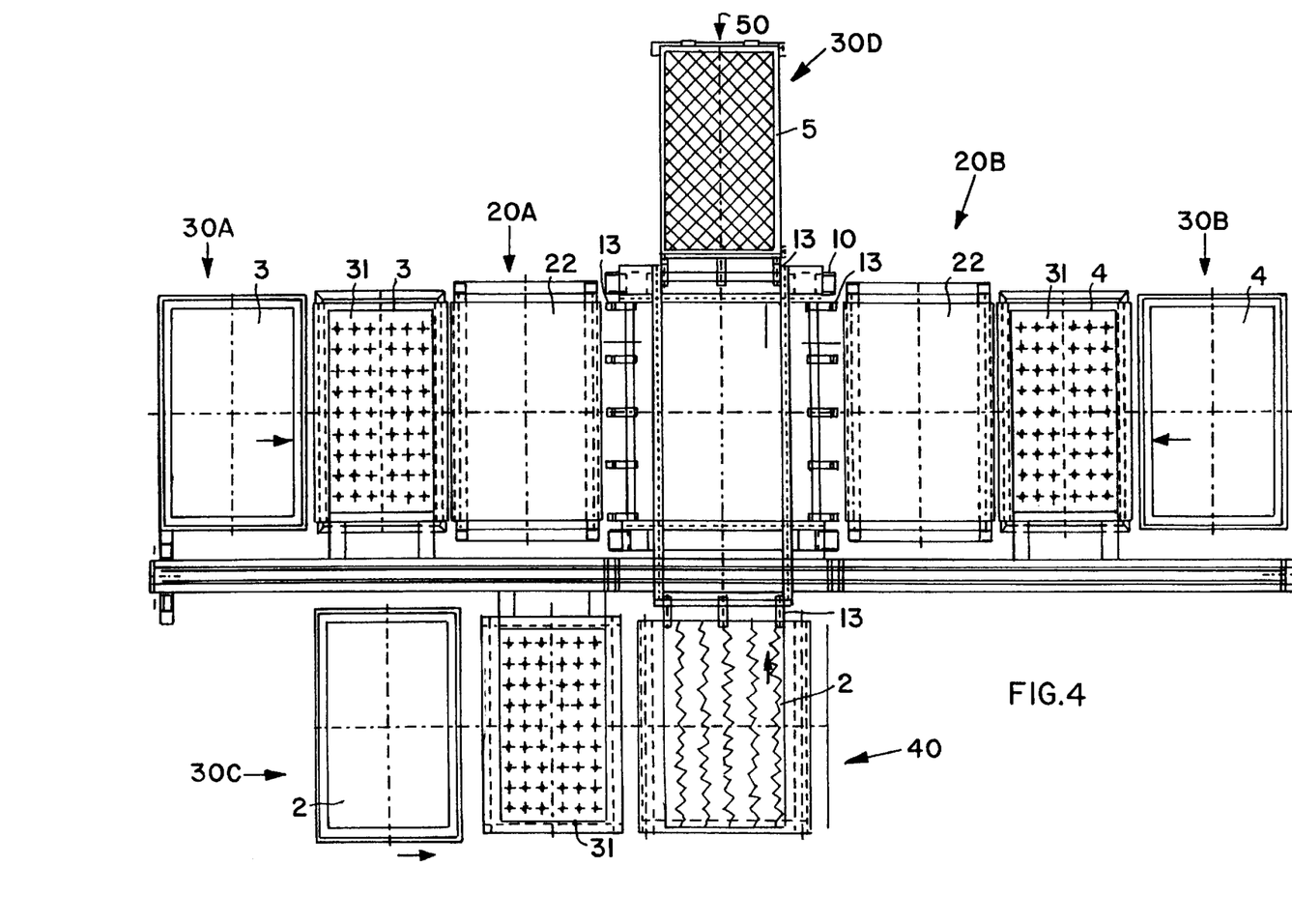
FIG. 4 is a top plan view of the apparatus according to FIG. 3.
Figure 5:
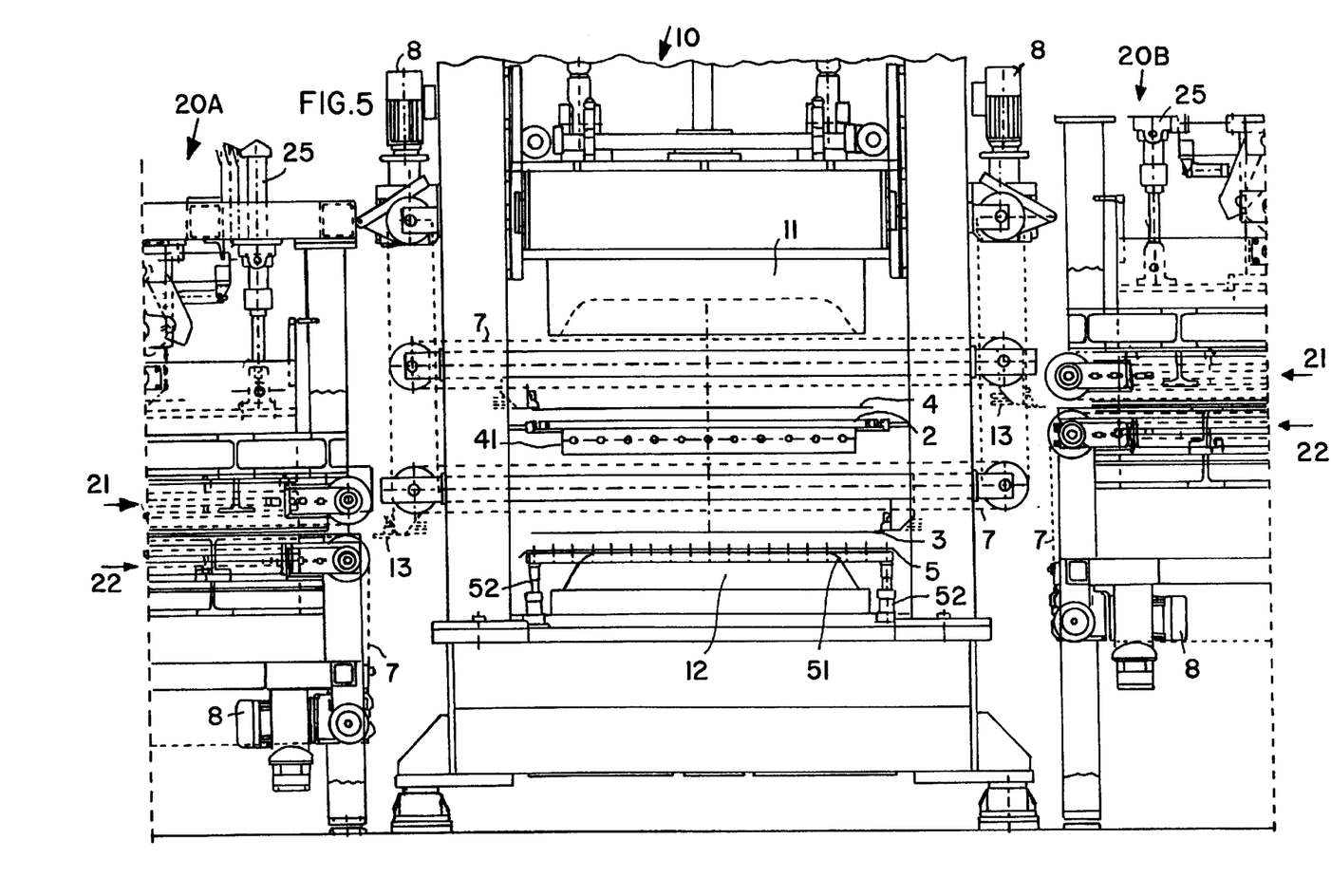
FIG. 5 is an enlarged detail view of a portion of the apparatus of FIG. 3, particularly showing a portion of the forming mold and portions of the two heating presses.

FIGS. 3, 4 and 5 respectively show a front view, a top view, and a detail partial view of an apparatus that is suitable for carrying out the inventive method and for producing the inventive composite structural panel. The apparatus includes: a forming mold 10; two heating presses 20, namely a left heating press 20A arranged to the left of the forming mold 10 and a right heating press 20B arranged to the right of the forming mold 10; several material supply stacks 30, namely a left outer layer stack 30A arranged to the left of the left heating press 20A, a right outer layer stack 30B arranged to the right of the right heating press 20B, a cover sheet stack 30D arranged behind the forming mold 10, and a foam core stack 30C arranged in front of the forming mold 10; a foam feeding and preheating station 40 arranged in front of the forming mold 10; and a cover sheet feeding station 50 arranged behind the forming mold 10.

The forming mold 10 includes an upper mold section 11 and a lower mold section 12 that are preferably cooled by a cooling fluid flowing through channels therein, and are movable relative to each other. For example, the upper mold section 11 can be moved up and down by hydraulic or pneumatic cylinders, in any known manner, while the lower mold section 12 remains fixed on a base frame. Respective left and right transport conveyors 23A and 23B are respectively arranged between the left outer layer stack 30A and the left heating press 20A, and between the right outer layer stack 30B and the right heating press 20B, for transporting respective sheets of the outer layer material 3 and 4 into the heating presses 20A and 20B. To achieve this, each material supply stack 30 is equipped with a needle gripper conveyor 31 for lifting a top sheet of material from the respective stack and transporting it onto the respective transport conveyor 23A or 23B, which in turn transports the outer layer material into the respective heating press.

The foam feeding and preheating station 40 includes a movable preheating or tempering plate 41 for pre-tempering the foam core material 2 and moving it from the station 40 into the forming mold 10. This pre-tempering plate 41 may be heated and/or cooled as needed using a fluid flowing through channels provided therein, for tempering the foam material as needed to achieve a temperature in the range of 40° C. to 100° C. The cover sheet feeding station 50 includes a movable needle gripper frame 51 for gripping the edges of the cover sheet 5 and moving it into position in the forming mold 10. Pneumatic cylinders 52 are provided for lifting and lowering the movable needle gripper frame 51 as needed during the molding cycle, i.e. to conform to the molding motion of the upper mold section 11 onto the lower mold section 12, so as to hold the cover sheet 5 under tension throughout the molding process and thereby avoid the formation of wrinkles, bubbles and pockets in the cover sheet in its finished molded configuration. The pneumatic cylinders may be active, semiactive, or passive, i.e. they may act as pneumatic springs and dampers that automatically yield to the greater pressure applied by the moving mold section for example.

As shown especially in FIG. 5, the heating presses 20A and 20B each include movable upper and lower heating plates 21 and 22 driven by hydraulic cylinders 25 for respectively preheating and precompressing the outer layer sheets 3 and 4 therebetween. To prevent the heated polypropylene material from sticking to the heating plates 21 and 22, the heating presses 20A and 20B further include closed-loop "Teflon" (TM) bands 7 that are driven by drive arrangements 8, as a release sheet between the respective heating plate and the outer layer material. These Teflon bands 7 may further act to transport the heated and compressed outer layer sheets 3 and 4 out of the heating presses 20A and 20B and into the forming mold 10. The forming mold 10 may similarly include such closed-loop moveable Teflon bands 7 driven by drive arrangements 8. The forming mold 10 further includes grasper tongs or jaws 13 that grasp the preheated outer layers 3 and 4, transport the outer layers and then hold the outer layers in the proper position and arrangement between the upper and lower mold sections 11 and 12.

The present apparatus is operated to carry out the inventive two-step method generally as described above. Namely, the respective needle gripper conveyors 31 each pick up a single sheet of the outer layers 3 or 4 or the foam core 2 from the respective material supply stacks 30A, 30B and 30C. The outer layers 3 and 4 are deposited onto the transport conveyors 23A and 23B, which respectively transport the outer layer materials into the heating presses 20A and 20B, where the outer layer materials are heated and precompressed between the upper and lower heating plates 21 and 22. The foam core 2 is received on the movable tempering plate 41, which tempers the foam core 2 and moves it into position between the upper and lower mold sections 11 and 12.

Meanwhile, a cover sheet 5 is picked up by the movable needle gripper frame 51 and moved into position between the tempering plate 41 and the lower mold section 12 in the forming mold 10. Then the preheated and precompressed outer layer 3 is moved by the grasper tongs or jaws 13 into position between the cover sheet 5 and the foam core 2, which has been released from the movable tempering plate 41, which in turn has been retracted from the mold 10. Then the upper mold section 11 is moved down onto the lower mold section 12 so as to carry out a first molding cycle or step in which the cover sheet 5 and the first outer layer 3 are laminated and fusion bonded onto the foam core 2, and this resulting pre-laminate is molded into the desired configuration.

Then, the upper mold section 11 is again lifted to open the mold, whereupon the second outer layer 4 is brought into position by the grasper tongs or jaws 13. Then the upper mold section 11 is again closed in a second molding cycle or step, whereby the outer layer 4 is laminated and fusion bonded onto the foam core 2 and the resulting composite structural panel is molded into its finished three-dimensional configuration. After a cooling time of 40 to 60 seconds, the finished structural panel can be removed from the opened mold.

By providing appropriate equipment for moving the four distinct layers into position in the forming mold from four different sides, i.e. four different directions, a relatively compact molding apparatus with a very efficient molding cycle can be achieved. By providing the separate right and left heating presses 20A and 20B, there is essentially no downtime or waiting time for the preheating and precompressing of the outer layer materials, and the overall molding operation can be carried out in rapid succession by alternately feeding the outer layer sheets 3 and 4 from the left heating press 20A and from the right heating press 20B. Furthermore, it is possible to adjust the heating presses to different temperatures, so that the first and second outer layers 3 and 4 can be heated to different temperatures if this is desired for any particular application to achieve the required bonding while avoiding overheating of the foam core.

It should be understood that the relative positions of the satellite stations around the forming mold 10 can be reversed or changed. For example, the foam feeding and preheating station 40 can be behind the forming mold 10, while the cover sheet feeding station 50 is in front of the feeding station 10, or the two outer layer supply stacks 30A and 30B could be arranged on adjacent sides offset by 90° rather than 180° from each other. The molding apparatus may further include any conventional devices and mechanisms for holding the various material layers in position, driving the components, and carrying out the necessary method steps.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A composite structural panel including a substrate that comprises:
    a core layer comprising a thermoplastic foam;
    a first outer layer that comprises a first thermoplastic material and first natural fibers, and that is thermally fusion bonded onto said core layer by thermal fusion of said first thermoplastic material with said thermoplastic foam; and
    a second outer layer that comprises a second thermoplastic material and second natural fibers, and that is thermally fusion bonded onto said core layer opposite said first outer layer so that said core layer is sandwiched between said first and second outer layers, by thermal fusion of said second thermoplastic material with said thermoplastic foam;
    and wherein said structural panel excludes glass fiber, polyurethane, epoxy, and adhesives.

2. The composite structural panel according to claim 1, wherein said thermoplastic foam, said first thermoplastic material and said second thermoplastic material all consist of the same polyolefin polymer.

3. The composite structural panel according to claim 2, wherein said polyolefin polymer is polypropylene.

4. The composite structural panel according to claim 3, wherein said natural fibers comprise kenaf plant fibers.

5. The composite structural panel according to claim 1, wherein said thermoplastic foam is a polyolefin foam, said core layer consists of said polyolefin foam, and said first and second thermoplastic materials respectively comprise a polyolefin matrix in which said natural fibers are embedded.

6. The composite structural panel according to claim 5, wherein said first and second thermoplastic materials respectively further comprise polyolefin fibers embedded in said polyolefin matrix.

7. The composite structural panel according to claim 6, wherein said polyolefin foam, said polyolefin fibers and said polyolefin matrix each consist of polypropylene.

8. The composite structural panel according to claim 1, wherein said first and second outer layers respectively comprise from 30% to 70% of said first and second natural fibers respectively, with a remainder of said first and second thermoplastic materials respectively.

9. The composite structural panel according to claim 1, wherein said core layer consists of said thermoplastic foam, which consists of expanded cellular polypropylene rigid foam.

10. The composite structural panel according to claim 9, wherein said foam is air permeable.

11. The composite structural panel according to claim 1, having a density in a range from 800 to 900 g/m$^2$, a thickness of said core layer in a range from 4 to 8 mm, and a sufficient stiffness to be self-supporting and form-stable.

12. The composite structural panel according to claim 1, further comprising a cover sheet bonded onto said second outer layer opposite said core layer, wherein said cover sheet comprises one of a textile fabric and a synthetic film, and a polyolefin backing that bonds said cover sheet onto said second outer layer.

13. The composite structural panel according to claim 1, having a three-dimensionally contoured form-stable configuration.

14. A composite structural panel comprising a three-layered substrate essentially consisting of a core layer that comprises an expanded cellular polypropylene rigid foam, and first and second outer layers that each respectively comprise natural fibers in a polypropylene matrix and that are respectively thermally fusion bonded onto opposite sides of said core layer by thermal fusion of said respective polypropylene matrix with said polypropylene rigid foam, so that said core layer is sandwiched between said outer layers, and wherein said structural panel excludes glass fiber, polyurethane, epoxy, and adhesives.

15. The composite structural panel according to claim 14, wherein said core layer essentially consists of said expanded cellular polypropylene rigid foam, and said outer layers each respectively essentially consist of said natural fibers in said polypropylene matrix.

16. The composite structural panel according to claim 15, wherein said polypropylene matrix has such a structure as is formed by at least partially melting polypropylene fibers, and said natural fibers comprise kenaf plant fibers.

17. A method of making the composite structural panel according to claim 1, comprising the following steps:
   a) pre-heating said first outer layer;
   b) pressure laminating said pre-heated first outer layer onto said core layer in a first molding cycle;
   c) pre-heating said second outer layer;
   d) pressure laminating said pre-heated second outer layer onto said core layer in a second molding cycle separate from and after said first molding cycle; and
   e) cooling said outer layers and said core layer.

18. The method according to claim 17, further comprising allowing a cooling time to elapse between said steps b) and d).

19. The method according to claim 17, wherein said steps b) and d) each respectively further include three-dimensionally molding said outer layer and said core layer.

20. The method according to claim 17, wherein said first and second outer layers are respectively pre-heated to a temperature in a range from 180° C. to 200° C. in said steps a) and c).

21. The method according to claim 20, further comprising a step of pre-tempering said core layer to a temperature in a range from 40° C. to 100° C. before said step b).

22. The method according to claim 17, wherein said steps a) and c) respectively further comprise pre-compressing said first and second outer layers.

23. The method according to claim 17, wherein said steps b) and d) respectively achieve a thermal fusion bonding of said first and second outer layers respectively onto said core layer, without melting more than 10% of said core layer.

24. A method of making the composite structural panel according to claim 1, comprising the following steps:
   a) pre-heating said first and second outer layers respectively to a temperature in a rang e from 160° C. to 190° C.;
   b) pre-tempering said core layer to a temperature in a range from 40° C. to 80° C.;
   c) pressure laminating said pre-heated first and second outer layers simultaneously onto respective opposite sides of said core layer during a single molding cycle; and
   d) cooling said outer layers and said core layer.

* * * * *